US012625956B2

(12) United States Patent
Brandel et al.

(10) Patent No.: US 12,625,956 B2
(45) Date of Patent: May 12, 2026

(54) PERFORMING AUTOMATED DIGITAL INVESTIGATIONS OF PHISHING ATTEMPTS

(71) Applicant: Target Brands, Inc., Minneapolis, MN (US)

(72) Inventors: Eric Robert Brandel, Minnetonka, MN (US); Daniel Christopher Jay Flettre, Roseville, MN (US)

(73) Assignee: Target Brands, Inc., Minneapolis, MN (US)

( * ) Notice: Subject to any disclaimer, the term of this patent is extended or adjusted under 35 U.S.C. 154(b) by 230 days.

(21) Appl. No.: 18/405,815

(22) Filed: Jan. 5, 2024

(65) Prior Publication Data

US 2025/0225239 A1    Jul. 10, 2025

(51) Int. Cl.
G06F 21/56          (2013.01)

(52) U.S. Cl.
CPC ........ G06F 21/56 (2013.01); G06F 2221/034 (2013.01)

(58) Field of Classification Search
None
See application file for complete search history.

(56) References Cited

U.S. PATENT DOCUMENTS

| | | | |
|---|---|---|---|
| 6,401,118 | B1 | 6/2002 | Thomas |
| 8,381,292 | B1 | 2/2013 | Warner et al. |
| 8,555,391 | B1 * | 10/2013 | Demir ..................... G06F 21/56 |
| | | | 713/188 |
| 8,800,040 | B1 * | 8/2014 | Tan ..................... H04L 63/1408 |
| | | | 709/224 |
| 8,839,418 | B2 | 9/2014 | Hulten et al. |
| 9,065,850 | B1 * | 6/2015 | Sobrier .............. H04L 63/1483 |
| 9,253,208 | B1 * | 2/2016 | Koshelev ................ H04L 63/20 |
| 10,498,761 | B2 * | 12/2019 | Wright .................. H04L 63/168 |
| 11,561,988 | B2 | 1/2023 | Jenkins |
| 11,582,226 | B2 * | 2/2023 | Starov ................. H04L 63/1441 |
| 12,045,610 | B1 * | 7/2024 | Myers ....................... G06F 8/60 |
| 12,271,720 | B1 * | 4/2025 | Silver .................... G06N 5/025 |
| 2007/0299777 | A1 * | 12/2007 | Shraim ................. H04L 51/212 |
| | | | 705/51 |
| 2008/0201464 | A1 * | 8/2008 | Campbell ........... H04L 63/1441 |
| | | | 709/224 |
| 2010/0325107 | A1 | 12/2010 | Kenton et al. |
| 2011/0225142 | A1 * | 9/2011 | McDonald ............ G06F 21/552 |
| | | | 707/E17.108 |

(Continued)

*Primary Examiner* — Christopher C Harris
(74) *Attorney, Agent, or Firm* — Barnes & Thornburg LLP

(57) ABSTRACT

In some implementations, a method is provided for performing automated digital investigations of phishing attempts. Source identification data is received for a potential source of phishing attempts, and is stored at a data repository. According to a monitoring frequency for the potential source of phishing attempts, monitoring operations are periodically performed, including using the source identification data to retrieve content from the potential source, storing the retrieved content with the source identification data, and executing rules on the source identification data and the retrieved content. Based on a result of executing the rules, it can be determined whether the potential source of phishing attempts is an actual source of phishing attempts, the monitoring frequency can be adjusted, and mitigating actions can optionally be performed.

19 Claims, 9 Drawing Sheets

(56)          References Cited

U.S. PATENT DOCUMENTS

| | | | |
|---|---|---|---|
| 2014/0172495 A1 | 6/2014 | Schneck et al. | |
| 2014/0358888 A1 | 12/2014 | Whitelaw et al. | |
| 2016/0055490 A1 | 2/2016 | Keren et al. | |
| 2016/0253679 A1 | 9/2016 | Venkatraman et al. | |
| 2016/0352805 A1 | 12/2016 | Seida | |
| 2016/0364567 A1* | 12/2016 | Akiyama | G06F 21/56 |
| 2018/0027013 A1* | 1/2018 | Wright | H04L 61/4511 |
| | | | 726/23 |
| 2021/0144174 A1* | 5/2021 | N | H04L 63/1416 |
| 2021/0203693 A1* | 7/2021 | Clausen | H04L 63/1425 |
| 2021/0314355 A1* | 10/2021 | Xu | H04L 63/083 |
| 2021/0377301 A1* | 12/2021 | Desai | G06F 21/577 |
| 2022/0030029 A1* | 1/2022 | Kagan | H04L 63/1483 |
| 2023/0208879 A1* | 6/2023 | Thomas | H04L 51/212 |
| | | | 726/4 |
| 2023/0421602 A1* | 12/2023 | Boyer | G06V 30/10 |
| 2024/0267395 A1* | 8/2024 | Zink | H04L 63/1416 |
| 2024/0356968 A1* | 10/2024 | Sinks | H04L 41/16 |

* cited by examiner

440

Rules

+ Create

Total: 6   Enabled: 5

442

| Tags | Title | Enabled | Updated | Created |
|---|---|---|---|---|
| fake_landing_page | fake landing page | ☑ | 5/21/2023, 12:57 PM | 5/17/2023, 2:31 PM |
| threat_match | browsing threat detected | ☑ | 5/17/2023, 9:25 PM | 5/17/2023, 9:25 PM |
| redirect  http_to_https | detect redirect type | ✕ | 5/16/2023, 4:54 PM | 4/14/2023, 1:19 PM |
| gift_card_harvester | gift card harvester | ☑ | 5/16/2023, 4:54 PM | 5/16/2023, 4:54 PM |
| parked | parked domains | ☑ | 4/22/2023, 8:17 PM | 4/22/2023, 10:23 AM |
| bad_host  bad_dns | URL scan bad hostname | ☑ | 4/22/2023, 11:07 AM | 4/22/2023, 10:50 AM |

FIG. 4C

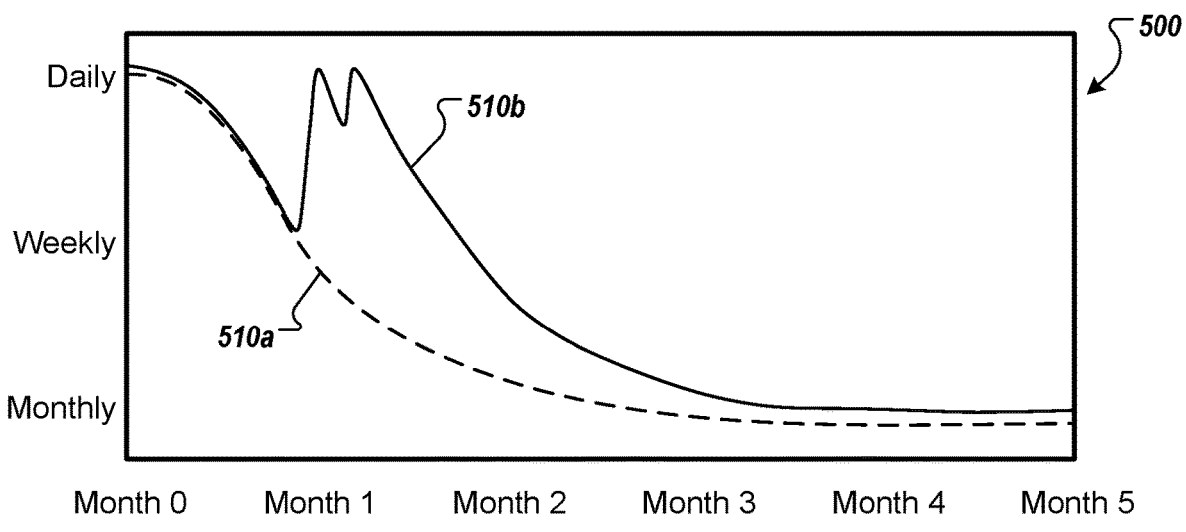

Daily

Weekly

Monthly

510b

510a

500

Month 0    Month 1    Month 2    Month 3    Month 4    Month 5

520a

| Activity | Result | Next Action |
|---|---|---|
| Domain Search | Discovered, Tag | 24 hours |
| Run Rules | None | 26 hours |
| Run Rules | None | 29 hours |
| Run Rules | None | 33 hours |
| ... | | |
| Run Rules | None | 1 week |
| ... | | |
| Run Rules | None | 1 month |

520b

| Activity | Result | Next Action |
|---|---|---|
| Domain Search | Discovered, Tag | 24 hours |
| Run Rules | None | 26 hours |
| Run Rules | None | 29 hours |
| Run Rules | None | 33 hours |
| ... | | |
| Run Rules | None | 6 days |
| Run Rules | Content Change | 24 hours |
| Run Rules | None | 26 hours |
| ... | | |
| Run Rules | None | 2 days |
| Search Query | Discovered, Tag | |
| Run Rules | Critical Alert, Tag | |
| Perform Action | | 6 hours |
| Run Rules | Action Verified, Tag | 12 hours |

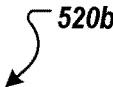

FIG. 5

PERFORMING AUTOMATED DIGITAL INVESTIGATIONS OF PHISHING ATTEMPTS

TECHNICAL FIELD

This specification generally relates to a platform for discovering potential sources of phishing attempts, performing automated digital investigations of the discovered sources, and performing mitigation actions to prevent phishing occurrences.

BACKGROUND

Phishing is practice in which a malicious actor attempts to deceive users into revealing sensitive information through deceptive practices. The malicious actor can generate online content that purports to be from a legitimate source, but is instead under the control of the malicious actor and is designed to harvest the users' sensitive information. Technical approaches to prevent phishing attempts can include content-based analysis, applying content filters, and maintaining lists of known phishing sites.

SUMMARY

This document generally describes computer systems, processes, program products, and devices for discovering potential sources of phishing attempts, performing automated digital investigations of the discovered sources, and performing mitigation actions to prevent phishing occurrences. In general, the Internet can provide a large attack surface area, including a vast and ever-changing pool of potential malicious actors and potential sources of phishing attempts. Tracking and dealing with such potential threats in a proactive (rather than a reactive) manner can be logistically and technically challenging. The presently described technology attempts to detect and mitigate the threats before users are impacted, in such a way that is automated and intelligent.

Briefly, the technology described in this document involves performing various discovery operations for identifying potential sources of phishing attempts, and periodically performing automated monitoring operations for determining whether a potential source is an actual source of phishing attempts. The discovery operations and the automated monitoring operations can be performed independently of each other, and according to customized schedules that are designed to balance the use of limited computing resources against the goal of discovering actual phishing attempts in a timely manner. The discovery techniques, for example, can involve searching for potential sources of phishing attempts from a variety of different online platforms, including trusted third party sources, search engines, and content platforms. The automated monitoring operations, for example, can involve periodically visiting the discovered potential sources, retrieving content from the sources, and executing preconfigured rules on the retrieved content.

Over time, a frequency of the automated monitoring operations can be appropriately adjusted, such that newly discovered potential sources of phishing attempts are frequently monitored, and over time, the potential sources are monitored less frequently (as long as the potential sources continue to be benign). By independently adjusting the monitoring frequency of the discovered sources, a large number of potential sources of phishing attempts can be concurrently tracked, while focusing the use of limited processing resources on the most likely actual sources. Such techniques, for example, can facilitate the scaling of a discovery/monitoring/mitigation system.

In response to the identification of a likely source of an actual phishing attempt, appropriate alerts can be triggered, and appropriate mitigation actions can be performed. User interfaces can be provided to configure the automated discovery and monitoring operations, to configure the rules and alerts, and to facilitate the performance of the mitigation actions. After performing a mitigation action, the source of an actual phishing attempt can continue to be monitored at an appropriate frequency, to verify the performance of the action. By mitigating the sources of actual phishing in a timely manner, for example, sensitive user information can be effectively protected.

In some implementations, a method for performing automated digital investigations of phishing attempts, performed by data processing apparatuses, includes receiving source identification data that identifies a potential source of phishing attempts; storing the source identification data at a data repository of discovered potential sources of phishing attempts; and according to a monitoring frequency for the potential source of phishing attempts, periodically performing monitoring operations on the potential source of phishing attempts. The monitoring operations can include using the source identification data to retrieve content from the potential source of phishing attempts; storing the retrieved content of the potential source of phishing attempts with the source identification data that identifies the potential source of phishing attempts; executing a set of predefined rules on the source identification data and the retrieved content of the potential source of phishing attempts; and based on a result of executing the set of predefined rules, (i) determining whether the potential source of phishing attempts is an actual source of phishing attempts, and (ii) adjusting the monitoring frequency for the potential source of phishing attempts such that subsequent performances of the monitoring operations occur at a frequency that is different from a current frequency for performing the monitoring operations.

Other implementations of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations can include any, all, or none of the following features. A domain search can be provided for a domain registrar. The domain search can include one or more search terms that relate to a subject system. The received source identification data can include a domain name of the potential source of the phishing attempts. The domain name can be provided by the domain registrar in response to the domain search. A search query can be provided for a search engine. The search query can include one or more search terms that relate to a subject system. The received source identification data can include a hyperlink to a landing page of the potential source of phishing attempts. The hyperlink to the landing page can be provided by the search engine in response to the search query. An identifier of a platform page of a content platform can be provided. The received source identification data can include an image of a content item being presented by the platform page, and a hyperlink to a landing page of the potential source of phishing attempts that is associated with the content item. The hyperlink to the landing page and the image of the content item being presented by the platform page can be located using the identifier of the platform page. A tracking component can be inserted into a sensitive web page of a subject system. The received source identification can include an address of a copy of the web page of the subject system. The copy of the web page can be hosted by a web server other than that of the subject system. Each rule of the set of predefined rules can be associated with a corresponding severity level. Determining whether the potential source of phishing attempts is an actual source of phishing attempts can include determining whether at least one rule that matches the potential source of phishing attempts has a critical severity level. In response to determining that the potential source of phishing attempts is an actual source of phishing attempts, an alert that identifies the source of phishing attempts can be generated and transmitted, and the monitoring frequency for the source of phishing attempts can be increased. The alert can be transmitted to a communication channel that had previously been specified through a rule generation interface that had been used to create a rule of the set of predefined rules that matches the source of phishing attempts. The alert can be transmitted to a phishing mitigation system that is configured to perform a mitigating action to handle the source of phishing attempts. In response to determining that the potential source of phishing attempts is not an actual source of phishing attempts, the monitoring frequency for the source of phishing attempts can be decreased. At least one discovery operation rule can be executed on the received source identification data that identifies the potential source of phishing attempts. The source identification data can be stored at the data repository of discovered potential sources of phishing attempts, and the monitoring operations can be performed on the potential source of phishing attempts, in response to the source identification data matching the at least one discovery operation rule. An interface can be presented for specifying a rule to be included in the set of predefined rules. The interface can include a rule definition control for defining computer code that is to be executed against the potential source of phishing attempts.

The systems, devices, program products, and processes described throughout this document can, in some instances, provide one or more of the following advantages. Multiple different techniques for discovering potential sources of phishing attempts can be performed concurrently and according to their own schedules, to increase the likelihood of discovering new sources in a timely manner. Identifying potential sources of phishing attempts proactively allows for action to be taken against confirmed sources before users are impacted. A frequency at which automated digital investigations are performed on potential sources of phishing attempts can change over time, to focus processing resources on sources that are more likely to be actual sources of phishing attempts. Rules can be executed on a potential source of phishing attempts and classification labels can be applied to the potential source, so that an appropriate mitigation action can be determined, and/or so that the potential source can be appropriately monitored over time. Rules can be configured to exclude some potential sources from monitoring, thus conserving processing resources. Executing the rules and determining matches for a possible source of phishing attempts can be executed periodically according to an appropriately customized schedule for the possible source, thus conserving processing resources while promptly handling actual phishing attempts. An interface can be provided that serves as a live editing tool that enables security specialists to interactively develop and test rules before the rules are placed into production. An interface can be provided to view historical scans of potential sources of phishing, which is valuable for security specialists investigating the sources. Additional source discovery techniques can be specified, and an interface can be provided for external applications to securely add new potential sources.

Other features, aspects and potential advantages will be apparent from the accompanying description and figures.

DESCRIPTION OF DRAWINGS

FIGS. 4A-4D depict example interfaces that can be provided by a phishing identification and mitigation system.

FIG. 5 depicts an example schedule and activity data log of an automated digital forensic investigation.

Like reference symbols in the various drawings indicate like elements

DETAILED DESCRIPTION

This document describes technology that can discover potential sources of phishing attempts, perform automated digital investigations of the discovered sources, and perform mitigation actions to prevent phishing occurrences. Briefly, various discovery operations can be performed for identifying potential sources of phishing attempts, and automated monitoring operations can be performed for determining whether a potential source is an actual source of phishing attempts. The discovery operations and the automated monitoring operations can be performed periodically and independently of each other, and according to customized schedules. The discovery techniques can involve searching for potential sources of phishing attempts from a variety of different online platforms, and the automated monitoring operations can involve periodically visiting the discovered potential sources, retrieving content from the sources, and executing preconfigured rules on the retrieved content. Over time, a frequency of the automated monitoring operations of the potential sources can be appropriately adjusted. In response to the identification of a likely source of an actual phishing attempt, appropriate alerts can be triggered, and appropriate mitigation actions can be performed.

Figure 1:
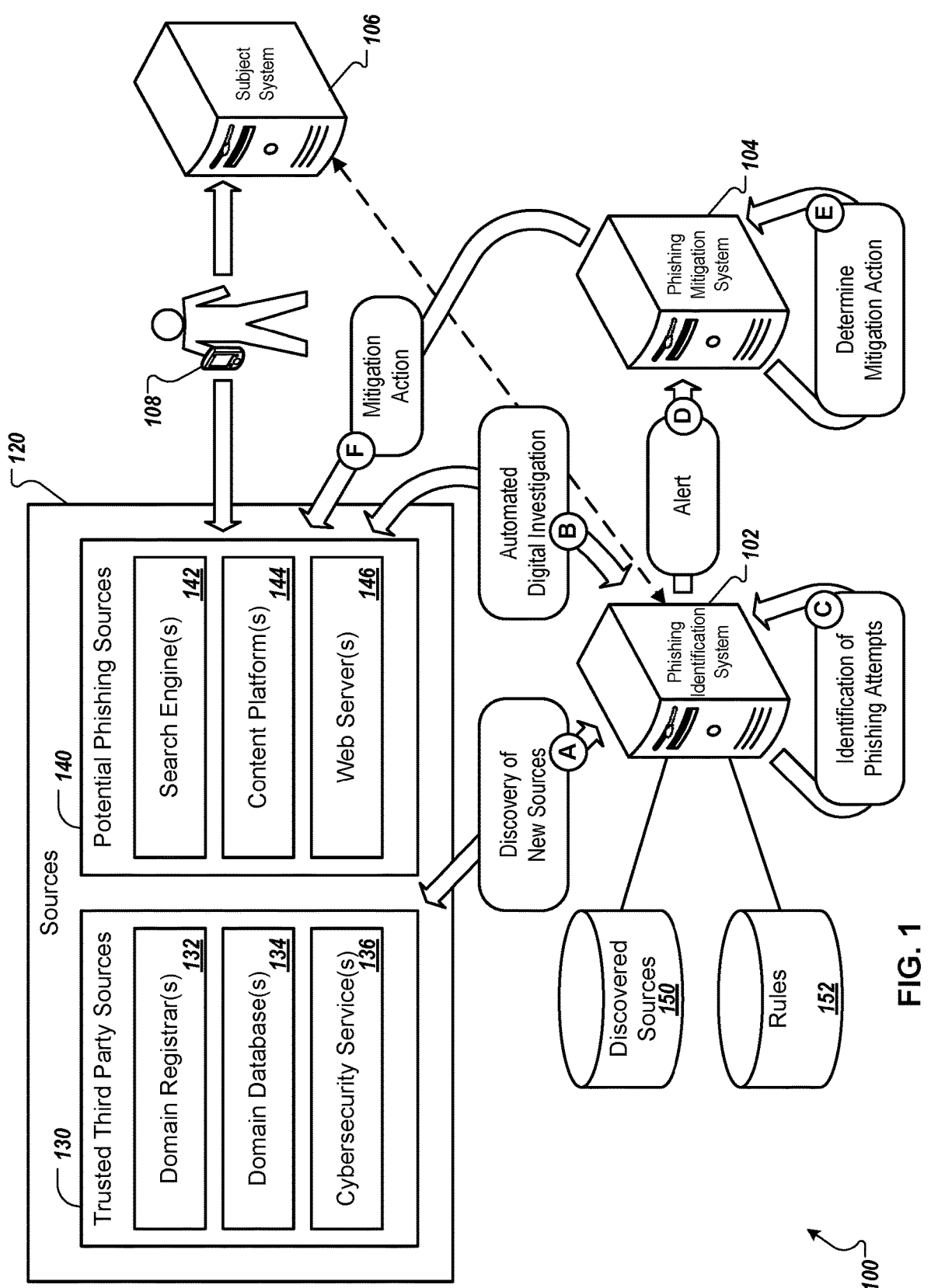
FIG. 1 depicts an example system for discovering potential sources of phishing attempts, performing automated digital investigations, and performing mitigation actions.

FIG. 1 depicts an example system 100 for discovering potential sources of phishing attempts, performing automated digital investigations, and performing mitigation actions, as represented in example stages (A) to (F). Stages (A) to (F) may occur in the illustrated sequence, or they may occur in a sequence that is different than in the illustrated sequence, and/or two or more stages (A) to (F) may be concurrent. In some examples, one or more stages (A) to (F)

may be repeated multiple times when identifying, investigating, and/or mitigating phishing attempts.

The system 100 can include a phishing identification system 102, a phishing mitigation system 104, and a subject system 106. Each of the systems 102, 104, 106, for example, can include one or more computing servers and one or more data sources. In some examples, multiple of the systems 102, 104, 106 can be combined into a single system, and/or any of the systems can be partitioned into two or more separate systems. In some examples, the computing servers can include various forms of servers, including but not limited to network servers, web servers, application servers, or other suitable computing servers. In some examples, the data sources can include databases, file systems, and/or cached data sources. The computing servers, for example, can access data from the data sources, can execute software that processes the accessed data, and can provide information based on the accessed/processed data to client devices that can be operated by users. Communication between the computing servers, the data sources, and the client devices, for example, can occur over one or more communication networks, including a LAN (local area network), a WAN (wide area network), and/or the Internet.

The phishing identification system 102, for example, can perform operations to discover potential sources of phishing attempts and to investigate the discovered sources. To perform the operations, for example, the phishing identification system 102 can access data from various web-based sources 120, including trusted third party sources 130 and potential phishing sources 140. In general, the sources 120 can include web servers that provide resources (e.g., web pages, applications, documents, content items such as graphics, audio, audiovisual media, etc., and other resources) in response to data requests (URIs (Uniform Resource Identifiers), URLs (Uniform Resource Locators), etc.). The trusted third party sources 130, for example, can include domain registrars 132, domain databases 134, cybersecurity services 136, and possible other sources. The potential phishing sources 140, for example, can include search engines 142, content platforms 144, web servers 146, and other possible sources. Although the trusted third party sources 130 do not generally include the potential phishing sources 140, the trusted third party sources 130 can be leveraged while discovering new potential sources of phishing attempts.

The phishing mitigation system 104, for example, can perform operations to determine appropriate mitigation actions in response to an identified phishing attempt, and to facilitate performance of the mitigation actions. Mitigation actions, for example, can include taking down a website, blocking content provided by a website, notifying system users about phishing attempts from websites, or other appropriate actions. In the present example, the phishing mitigation system 104 can be in communication with the phishing identification system 102, and any of the sources 120.

The subject system 106, for example, can be operated and maintained by an organization, and can be the target of phishing attempts. For example, the subject system 106 can include one or more websites of the organization, which can provide access to the organization's data through various portals (e.g., customer portals, vendor portals, employee portals, etc.). In the present example, a user can employ a computing device 108 (e.g., a stationary or mobile processing device including, but not limited to a desktop computer, a laptop computer, a tablet computer, a personal digital assistant (PDA), a smartphone, or another processing device) to access the subject system 106 (e.g., the organization's website) and to access any of the sources 120. A malicious actor can generate web-based resources that purport to be affiliated with the organization that is responsible for the subject system 106, for example, with the intent of deceiving the user of the computing device 108 for the purpose of harvesting the user's information (e.g., login credentials, account information, or other private information). The maliciously generated web-based resources (e.g., phishing attempts), for example, can be surfaced to the user through the search engine(s) 142, the content platform(s) 144, and/or other web server(s) 146.

Preventing phishing attempts by malicious actors can be challenging from a technical and a logistical standpoint, since the number of resources available on the web is vast, and the resources are constantly changing (e.g., with new web domains being created, existing domains being removed, and resources available from the domains being added, removed, and modified). To solve the technical problem of preventing phishing attempts across a vast and ever changing landscape, for example, the system 100 can automatically perform operations to discover potential sources of phishing attempts, to monitor the potential sources over time, to identify actual phishing attempts, and to determine and perform mitigation actions in response to the identification of the actual phishing attempts. Such automated operations, for example, can serve to protect the data of the subject system 106 and the computing device 108 from malicious actors.

During stage (A), new sources can be discovered. For example, the phishing identification system 102 can access the sources 120 (e.g., including the trusted third party sources 130 and the potential phishing sources 140) to discover new potential sources of phishing attempts. In some implementations, multiple different source discovery techniques can be employed. The multiple different discovery techniques, for example, can each be independently executed according to its own schedule (e.g., once per day, twice per day, once every four hours, once per hour, once every five minutes, or at another appropriate interval), with data pertaining to the discovered sources being stored in a same data repository (e.g., a discovered sources data repository 150) for later digital investigation.

Figure 2:
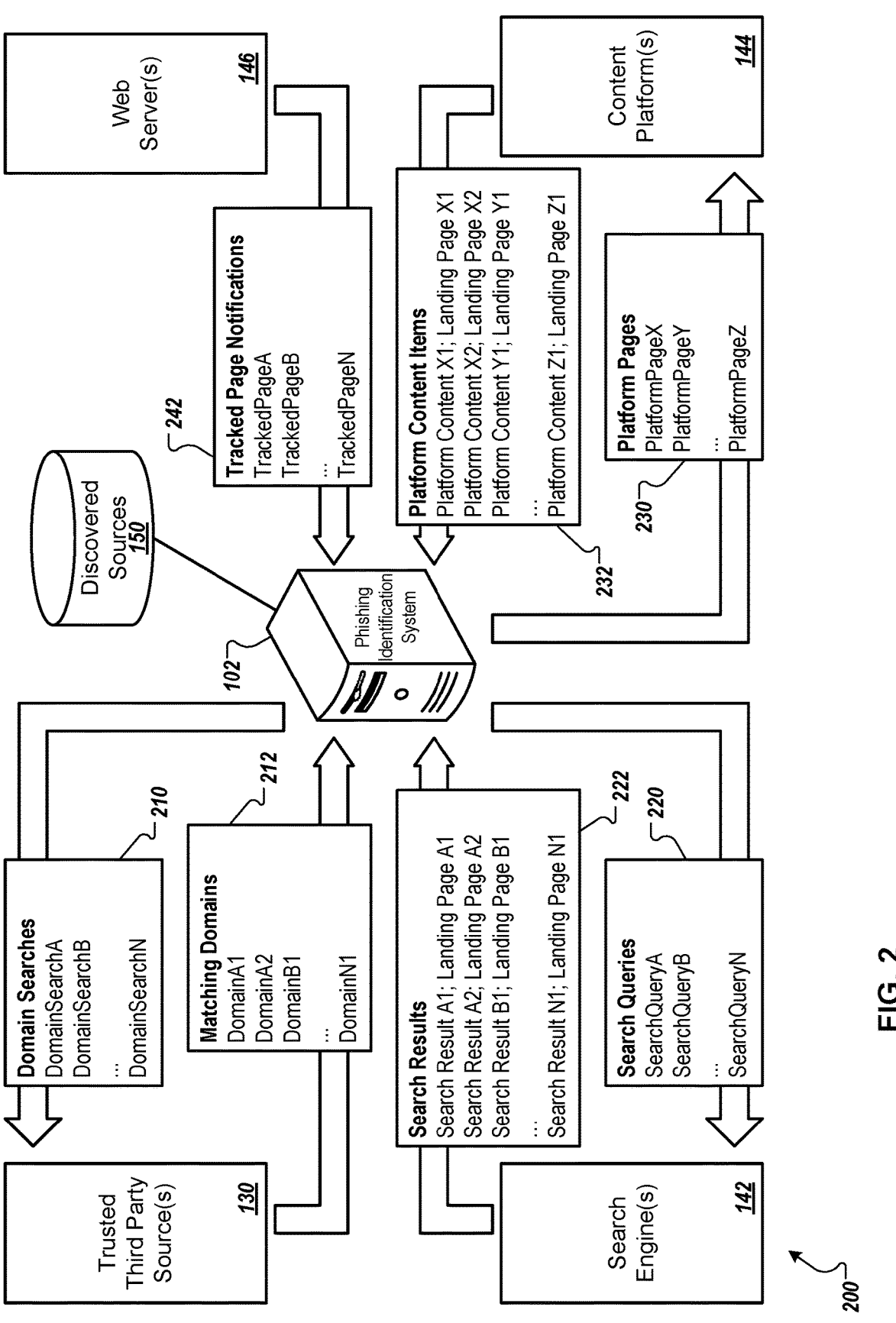
FIG. 2 depicts example techniques for discovering potential sources of phishing attempts.

Referring now to FIG. 2, example techniques 200 for discovering potential sources of phishing attempts are depicted. In the present example, four different techniques for discovering potential sources of phishing attempts are illustrated and described, including accessing data from trusted third party source(s) 130, accessing data from search engine(s) 142, accessing data from content platform(s) 144, and receiving notification data from other web server(s) 146. In other examples, more or fewer techniques for discovering potential sources of phishing attempts can be employed.

One of the techniques for discovering potential sources of phishing attempts can include accessing data from trusted third party sources, such as domain registrars, domain databases, and/or cybersecurity services. For example, a malicious actor can register a new domain that has a name of the actor's choosing, which may potentially be similar (e.g., having one or more similar or same words) to a domain name of the subject system 106 (shown in FIG. 1) and/or an organization that is responsible for the subject system 106. The intent of the malicious actor, for example, can be to deceive users that visit the new domain such that the users believe they are visiting a website and/or receiving content from the subject system 106 rather than a website controlled by the malicious actor. However, some newly registered domains may be similar to a domain name of the subject system with no malicious intent—for example, a word in the domain name can be a commonly used word, or can have multiple meanings. By performing an initial discovery of newly registered domains and performing a follow-up digital investigation of the discovered domains, for example, the benign domains can be separated from the malicious domains. Further, domains that initially appear to be benign can be revisited and tracked over time, in order to detect instances in which an initially benign domain is later repurposed by a malicious actor.

With respect to the source discovery technique that involves accessing data from trusted third party source(s) 130, for example, the phishing identification system 102 can provide a set of domain searches 210 for receipt by the trusted third party source(s) 130 (e.g., including the domain registrar(s) 132, the domain database(s) 134, and/or the cybersecurity service(s) 136, shown in FIG. 1), and in turn can receive a set of matching domains 212. In some implementations, the set of domain searches 210 and the matching domains 212 can be directly exchanged between the phishing identification system 102 and the trusted third party source(s) 130. In some implementations, the set of domain searches 210 and the matching domains 212 can be exchanged through an intermediary system (not shown).

In the present example, multiple different searches can be performed for newly registered domains (e.g., domains that have been registered since a previous search was performed), including the domain searches 210 (e.g., "Domain-SearchA," "DomainSearchB," etc., and "DomainSearchN"). Each of the domain searches 210, for example, can include one or more search terms that relate to the subject system 106. For example, if the domain of a website provided by the subject system 106 were to be "CompanyX.org," the various domain searches 210 could include "CompanyX" and variations thereof (e.g., common misspellings, terms with lookalike replacement characters, etc.). For each of the domain searches 210, for example, the trusted third party source(s) 130 can provide one or more newly registered domain names that match the domain search (e.g., the matching domains 212). Further, the trusted third party source(s) can provide metadata associated with the domain, such as a creation date, an update date, a registrar, registrar abuse contact information, administration contact information, and other relevant metadata. Upon receipt by the phishing identification system 102, for example, the matching domains 212 and the associated metadata can be provided to the discovered sources data repository 150 for storage and for subsequent automated digital investigation.

Another of the techniques for discovering potential sources of phishing attempts can include accessing data from search engines. In general, search engines can receive a search query that includes one or more search terms, and in response can provide search results that include hyperlinks to resources (e.g., web pages, applications, documents, content items such as graphics, audio, audiovisual media, etc., and other resources) that are related to the search query. The search results, for example, can also include a portion of content from the resource (e.g., a text snippet, an image preview, etc.) and metadata that is related to the resource (e.g., a resource title, a modification date for the resource, a date on which the resource was indexed by the search engine, etc.). The search results can include organic search results and sponsored search results. Organic search results, for example, can include search results that are unsponsored and are instead identified and ranked by the search engine based on relevance to the search query, incoming and outgoing links, domain authority, and other suitable factors. Sponsored search results, for example, can be search results that are paid for by content sponsors (e.g., through an auction in which multiple sponsors bid on having their content presented to users through a search engine in response to a user's search query having specified keywords). A malicious actor, for example, can maintain a website that includes textual and/or graphical content that is similar to that of the subject system 106, such that the malicious actor's website is likely to be surfaced in organic search results provided by the search engine in response to a user's search query that is intended to surface the website of the subject system. As another example, the malicious actor can participate in an online auction to have a sponsored search result of the actor presented to users in response to search queries that contain a keyword/keyphrase that is related to an organization that is affiliated with the subject system 106 (e.g., "CompanyX"). Under such scenarios, a user may be deceived into believing that a resource that is surfaced through a search result (e.g., organic or sponsored) is from the subject system 106, when it is instead under the control of a malicious actor.

With respect to the source discovery technique that involves accessing data from search engine(s) 142, for example, the phishing identification system 102 can provide a set of search queries 220 for receipt by the search engine(s) 142, and in turn can receive a set of corresponding search results 222. In some implementations, the search queries 220 and the search results 222 can be directly exchanged between the phishing identification system 102 and the search engine(s) 142. In some implementations, the search queries 220 and the search results 222 can be exchanged through an intermediary system (not shown). For example, the phishing identification system 102 or the intermediary system (e.g., a proxy) can be configured to hide the source of the search queries 220, and/or to submit the search queries in such a manner so that search results 222 returned by the search engines(s) 142 are intended for recipients having a variety of different device types and being in a variety of different locations.

In the present example, multiple different searches can be performed for web resources that match the set of search queries 220 (e.g., "SearchQueryA," "SearchQueryB," etc., and "SearchQueryN"). Each of the search queries 220, for example, can include one or more search terms that relate to the subject system 106. For example, if a website provided by the subject system 106 were to include a web page that is likely to be a target of phishing attempts by malicious actors, and that includes the keywords of "CompanyX" and "Login Portal," the various search queries 220 could include the terms "CompanyX," "Login Portal," and variations thereof. For each of the search queries 220, for example, the search engine(s) 142 can provide one or more organic and/or sponsored search results in response to the search query (e.g., the search results 222). For example, each of the search results 200 can include a hyperlink to a particular resource (e.g., a URL of a landing page), a portion of content from the resource that was surfaced by the search engine (and/or sponsored content), and resource metadata. Upon receipt by the phishing identification system 102, for example, each of the search results 222 can be provided to the discovered sources data repository 150, where the data can be stored with the search query that was used to surface the search result (and optionally, with identifiers of the type of device and the location for which the search result was intended by the search engine), for subsequent automated digital investigation.

Another of the techniques for discovering potential sources of phishing attempts can include accessing data from content platforms. In general, content platforms can provide web pages that include content slots into which content items (e.g., including textual and/or media components) can be inserted. The content items, for example, can also be associated with hyperlinks that direct users who interact with the content items (e.g., select, click, etc.) to another web resource (e.g., a landing page). In some examples, the subject system 106 can be a content platform that provides the web pages with the content slots into which content items can be inserted. In some examples, the content platform can be a system other than the subject system 106. A malicious actor, for example, can generate a content item that purports to be associated with the organization that is responsible for the subject system 106, and can cause the content item to be presented in a content slot of a platform page of the content platform (e.g., by submitting the content item to the content platform). The content item generated by the malicious actor, for example, can have a hyperlink to the malicious actor's website. Under such a scenario, a user may be deceived into believing that a resource that is presented through interaction with the malicious actor's content item is associated with subject system 106, when it is instead under the control of the malicious actor.

With respect to the source discovery technique that involves accessing data from content platform(s) 144, for example, the phishing identification system 102 can provide identifiers for a set of platform pages 230 of the content platform(s) 144, and in turn can receive data that identifies a set of corresponding platform content items 232. In some implementations, the identifiers for the platform pages 230 and the data that identifies the platform content items 232 can be directly exchanged between the phishing identification system 102 and the content platform(s) 144. In some implementations, the identifiers for the platform pages 230 and the data that identifies the platform content items 232 can be exchanged through an intermediary system (not shown).

In the present example, multiple different platform pages 230 (e.g., including "PlatformPageX," "PlatformPageY," etc., and "PlatformPageZ") can be analyzed to identify content items that are being presented in content slots of the platform pages. Each of the platform pages 230, for example, can be a different web page of a content platform (or multiple different content platforms) that accepts content items from various entities (e.g., including potential malicious actors), and presents the content items in content item slots at its discretion. In general, content items that are presented in a content item slot of a platform page can change over time. For example, the content platform can present an initial content item in a content item slot, then at a later time, replace the content item with a different content item in the content item slot at a later time, and so forth. For each of the platform pages 230, for example, the phishing identification system 102 (or an intermediary system) can visit the page, can retrieve any content items that exist in content item slots of the page, and for each content item, can identify a hyperlink to a resource (e.g., a URL of a landing page) that is associated with the content item. Upon receipt by the phishing identification system 102, for example, each of the platform content items 232 and the associated hyperlinks can be provided to the discovered sources data repository 150, where the data can be stored with an identifier of the platform page that included the content item, for subsequent automated digital investigation.

Another of the techniques for discovering potential sources of phishing attempts can include receiving notification data from web servers other than the search engines or content platforms. For example, a malicious actor can copy a portion (e.g., one or more web pages) of a website of the subject system 106, can modify the copied portion, and can host the modified portion on a domain that is under the control of the malicious actor. Thus, the modified (and malicious) website can have the look and feel of the website of the subject system 106, and may be more likely to deceive users into believing that the malicious website is that of the organization that is associated with the subject system 106. In general, malicious actors tend to copy and modify sensitive web pages that are designed to collect user information (e.g., login credentials, account information, or other private information). To detect such copying/modification, for example, a tracking component (e.g., an SVG (Scalable Vector Graphic) tag) can be inserted into a sensitive web page of the subject system 106. The tracking component, for example, can include obfuscated code (e.g., JavaScript) that appears to be related to the normal look and feel of the sensitive web page (e.g., providing graphic display functionality, etc.), but instead identifies a domain from which the web page is currently being provided, and if the identified domain is other than that of the subject system 106, sends a notification including the identified domain to an endpoint that is under the control of an organization that operates the phishing identification system 102. When copying/modifying the sensitive web page, for example, a malicious actor will likely fail to remove the obfuscated code (as it appears to be related to normal operations of the page), and the obfuscated code will thus be executed by a user's computing device (e.g., computing device 108) when the sensitive web page is presented, thereby alerting the phishing identification system 102 to a potential phishing attempt. Further, since the obfuscated code does not get executed until it is at the user's computing device, the true purpose of the code may be difficult for the malicious actor to discern.

With respect to the source discovery technique that involves receiving notification data from web server(s) 146, for example, the phishing identification system 102 can receive notifications associated with tracked pages 242 that are being hosted on web server(s) 146 (e.g., web servers other than web servers of the subject system 106). In some implementations, the tracked page notifications 242 can be received directly from computing devices that present tracked pages that are provided by web servers that host the tracked pages. In some implementations, the tracked page notifications 242 can be received from an intermediary system (not shown). For example, after presenting a tracked page that is hosted by a web server 146, a corresponding tracked page notification 242 that identifies the web server's domain (and optionally, the web address of the tracked page) can be generated and provided by the computing device 108, and can be received by the phishing identification system 102 directly from the computing device 108 or from the intermediary system.

In the present example, multiple different tracked page notifications 242 (e.g., "TrackedPageA," "TrackedPageB," etc., and "TrackedPageN") can be received by the phishing identification system 102. The notifications 242, for example, can originate from various computing devices (e.g., computing device 108) that receive and present tracked pages from the websites of malicious actors (e.g., sensitive web pages that have been copied from the subject system 106 by the malicious actors and that include tracking components). For example, the computing device 108 can execute code of the tracking component of the tracked page, which causes the computing device to generate and send a notification that includes the tracked page's web address.

Upon receipt by the phishing identification system 102, for example, the web addresses of the tracked pages associated with the tracked page notifications 242 can be provided to the discovered sources data repository 150, where the data can be stored for subsequent automated digital investigation.

In some implementations, storing data that represents a newly discovered source can include labeling the data with an identifier of a discovery technique used to discover the source. For example, each of the matching domains 212 that result from the set of domain searches 210 can be labeled with an indication that the domain was discovered through a domain search. As another example, each of the landing pages for the search results 222 that result from the set of search queries 220 can be labeled with an indication that the landing page was discovered through a search query. As another example, each of the landing pages for the platform content items 232 that were located on the platform pages 230 can be labeled with an indication that the landing page was linked to a content item that was presented on a platform page. As another example, each of the tracked pages that is associated with one or more of the tracked page notifications 242 can be labeled with an indication that the tracked page was discovered through a tracked page notification. The labels, for example, can be useful for subsequent processing of the data stored by the discovered sources data repository 150 during an automated digital investigation, including detecting instances in which a same website or web page is rediscovered and/or discovered using multiple different techniques.

In general, each of the techniques for discovering potential sources of phishing attempts (e.g., the example techniques 200 depicted in FIG. 2) can be performed according to its own schedule, independent of the other techniques. For example, the technique that includes accessing data from the trusted third party source(s) 130 can be performed periodically according to a regular, moderate frequency (e.g., once every other day, once a day, twice a day, or another suitable frequency), with the domain searches 210 specifying that new matching domains 212 (e.g., domains that have been newly registered or updated since a previous request) are to be returned by the trusted third party source(s) 130. As another example, the domain searches 210 can simply request any matching domains 212, and after receiving the matching domains 212 (and any associated metadata), the phishing identification system 102 can determine which of the domains are newly registered or updated. In contrast, the technique that includes accessing data from the search engine(s) 142 can be performed continually, or according to a more frequent schedule (e.g., once every five minutes, once every fifteen minutes, once every hour, or another suitable frequency). Since the search results that are returned by the search engine(s) 142 in response to a same query can frequently change over time, for example, submitting the search queries frequently can increase the likelihood of discovering new phishing attempts. Similarly, the technique that includes accessing data from the content platform(s) 144 can be performed relatively frequently. For example, the technique can be performed according to a frequency at which the content platforms replace content items in their platform pages. For each of the techniques that involve the trusted third party source(s) 130, the search engine(s) 142, and the content platform(s) 144, for example, data requests and matching results can be provided in batches at varying intervals, whereas tracked page notifications 242 for the other web server(s) 146 can be received in real-time, in response to individual detection events.

Referring again to FIG. 1, for example, after a potential phishing source has been discovered (e.g., during stage (A)), subsequent stages can include performing an automated digital investigation of the potential phishing source (e.g., during stage (B)). If a phishing attempt is identified (e.g., stage (C)) from the automated digital investigation, for example, an alert can be generated (e.g., stage (D)), a mitigation action can be determined (e.g., stage (E)), and the mitigation action can be performed (e.g., stage (F)). The discovery of new potential phishing sources (e.g., stage (A)) can be performed using various different techniques according to various different schedules, and can be performed independently of and concurrently with stages (B)-(F), which can generally be separately performed for each previously identified potential phishing source. Stages (B)-(F), for example, will be described in further detail below with respect to the flow diagram of FIG. 3 and interfaces of FIGS. 4A-4D.

Figure 3:
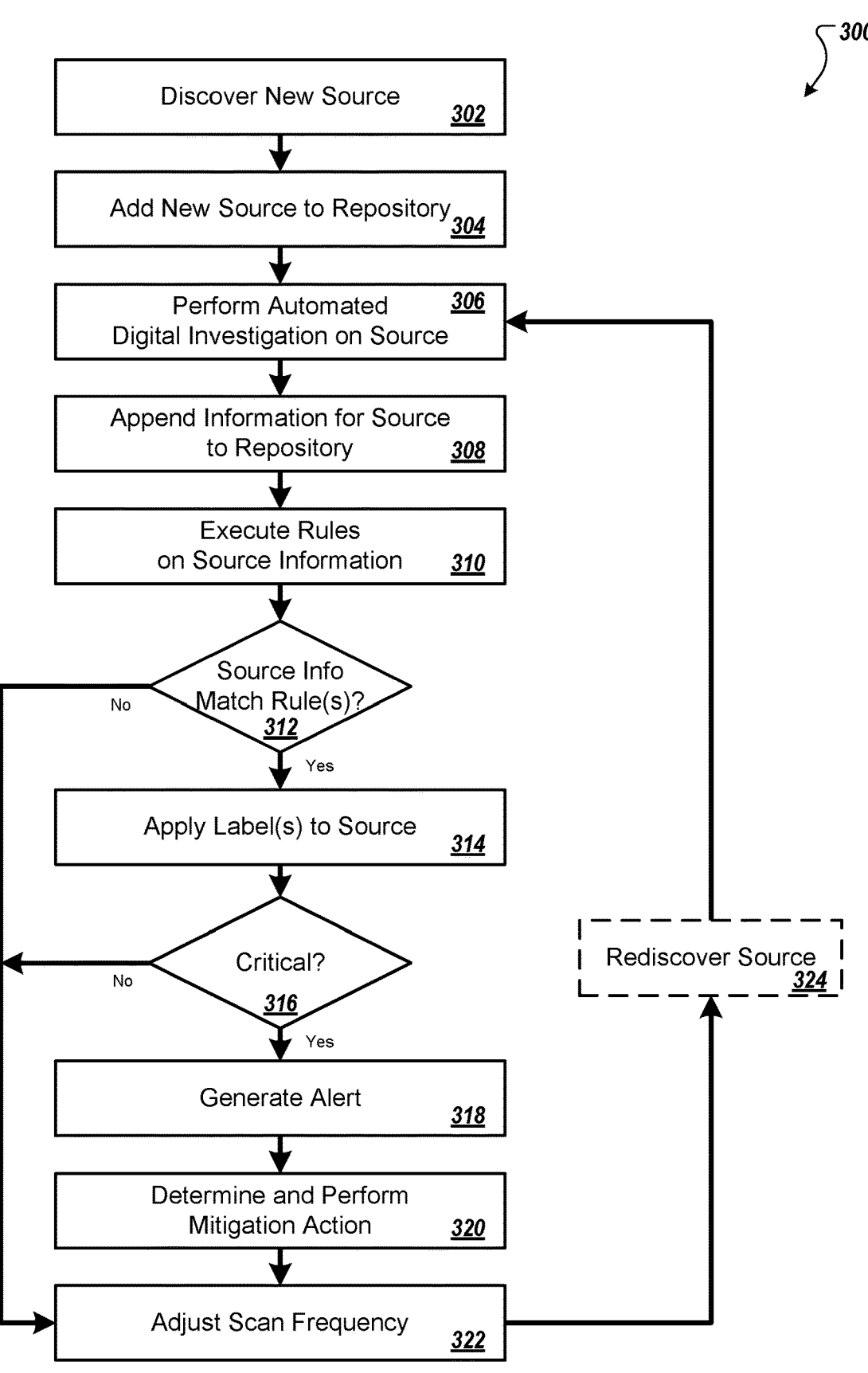
FIG. 3 is a flow diagram of an example technique for discovering potential sources of phishing attempts, performing automated digital investigations, and performing mitigation actions.

Referring now to FIG. 3, a flow diagram of an example technique 300 is shown for discovering potential sources of phishing attempts, performing automated digital investigations, and performing mitigation actions. In the present example, the technique 300 can be performed by components of the system 100, and will be described with reference to FIG. 1. However, other systems may be used to perform the same or a similar process.

At 302, a new potential source of phishing attempts can be discovered, and at 304, the newly discovered potential source of phishing attempts can be added to a repository. The discovery of a new potential source of phishing attempts and the adding of related data to a repository, for example, can be performed by the phishing identification system 102 (and one or more possible intermediary systems), as described above with respect to stage (A), using any of the techniques 200 (shown in FIG. 2). In some implementations, discovering and adding new sources to a repository can include determining whether the source has been previously discovered. For example, a potential source of phishing attempts can be discovered using multiple different discovery techniques 200 and/or can be rediscovered at multiple different times. If data that represents a discovered source is already found in the discovered sources data repository 150, for example, the discovered source can be considered a duplicate. Rather than generating another data entry for the discovered source, for example, the existing record for the source can instead be updated to include data related to the new discovery event (e.g., including a label that represents the discovery method, a timestamp, and other relevant metadata).

Optionally, a set of rules can be executed on the information that has been received for a potential source of phishing attempts during a discovery operation (e.g., stage (A)), and a discovered potential source can be added to a repository for further investigation in response to the information matching one or more of the rules (e.g., similar to the rules described below with respect to box 310 and FIGS. 4C-4D). For the potential sources that are discovered from accessing data from search engine(s) 142 and content platform(s) 144, for example, the received content for the search results and platform content items (e.g., including a hyperlink, text, graphics, etc.) can be analyzed against the rules. If the information does not match one or more of the rules, for example, the discovered potential source can be determined as likely being benign, and not a suitable candidate for further monitoring.

At 306, an automated digital investigation of the potential source of phishing attempts can be performed (e.g., during stage (B), shown in FIG. 1). In general, the automated digital investigation can be initially performed by the phishing identification system 102 in response to a new discovery of a potential source of phishing attempts (e.g., a non-duplicate discovery), and the automated digital investigation can be periodically repeated for the potential source at multiple additional future times, according to a customized and modifiable schedule for the potential source. In some implementations, performing an automated digital investigation of a potential source of phishing attempts can include directly accessing the potential source and retrieving content from the potential source. Using a web address for a potential source of phishing attempts (e.g., a hyperlink to a domain homepage, a hyperlink to a landing page of a search result, a hyperlink to a landing page of a content item that has been embedded in a platform page, a hyperlink to a tracked page, etc.) the phishing identification system 102 (or an intermediary system) can access a corresponding web resource (e.g., a web page, an application, a document, a content item, or another sort of resource), and can retrieve content from the resource (e.g., a screenshot of the resource, HTML (Hyper Text Markup Language) of the resource, media files that are included in the resource, etc.).

At 308, information that has resulted from the automated digital investigation of the potential source of phishing attempts can be appended to the repository. For example, the phishing identification system 102 can add the content retrieved from the potential source of phishing attempts to the discovered sources data repository 150, where the retrieved content can be associated with data that had been received for the potential source during the previously performed discovery operation (e.g., stage (A)). For a potential source that had been discovered from a domain search by one or more of the trusted third party source(s) 130, for example, the content of a domain homepage can be associated with the domain name and metadata. For a potential source that had been discovered through a search query provided to the search engine(s) 142, for example, the content of the landing page of a search result can be associated with the web address of the landing page, content that was provided by the search engine with the search result, resource metadata, and search parameter data. For a potential source that had been discovered through accessing the content platform(s) 144, for example, the content of a landing page of a content item can be associated with the web address of the landing page, the web address of the platform page that included the content item, and the content item that was presented at the platform page. For a potential source that had been discovered through a tracked page provided by another web server 146, for example, the content of the tracked page can be provided with the address of the tracked page. Further, regardless of discovery technique, the phishing identification system 102 can store timestamps that indicate when automated digital investigations of the potential source of phishing attempts have been performed.

Figure 4A:
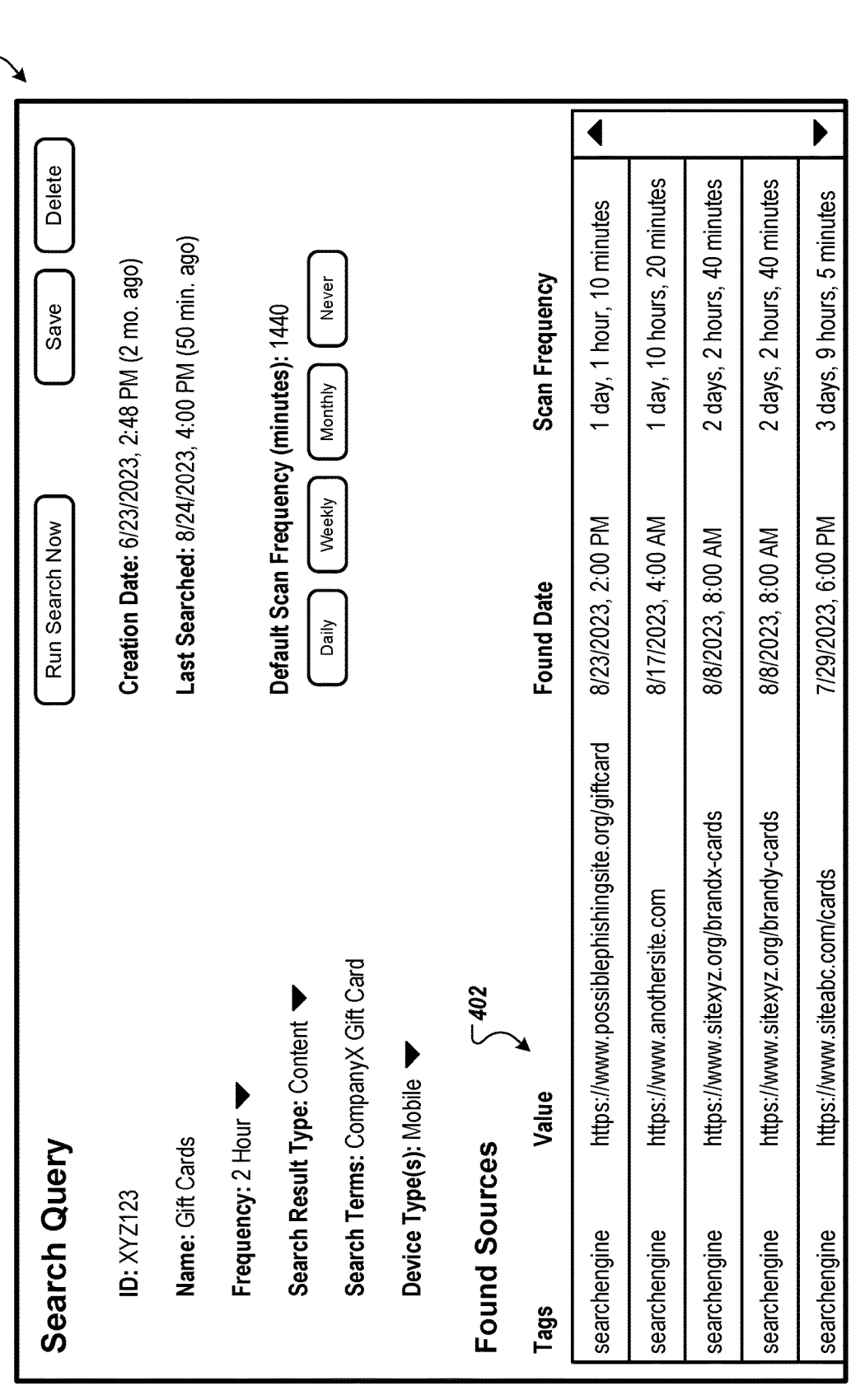

Referring now to FIG. 4A, an example interface 400 is depicted that can be provided by a phishing identification and mitigation system (e.g., systems 102, 104) for facilitating the discovery of potential sources of phishing attempts, for facilitating automated digital investigations, and for presenting resulting information that has been stored in a repository. The interface 400 of the present example can be used to define any of the search queries 220 (shown in FIG. 2) for the discovery technique that involves accessing data from search engine(s) 142, and for presenting the corresponding search results that are returned in response to the defined search query. Similar configuration interfaces (not shown) can be configured for defining and presenting the results of the other techniques 200 for discovering potential sources of phishing attempts.

In the present example, the interface 400 includes an identifier (e.g., "XYZ123") and a name (e.g., "Gift Cards") for a search query to be provided to the search engine(s) 142. Through the interface 400, for example, an operator can also specify a list of search terms to be included in the query (e.g., "CompanyX Gift Card"), a frequency at which the search query is to be submitted to the search engine(s) (e.g., 2 hours), a device type that the search query is to appear to the search engine(s) as having originated from (e.g., a mobile device), and a search result type to monitor (e.g., sponsored content). In the present example, a creation date of the search query and a last searched date for the search query are also presented, along with controls through which an operator can specify that a search query is to be saved, deleted, or run at a present moment. Further, in the present example, the interface 400 includes a set of controls through which an operator can specify a default scan frequency (e.g., a frequency at which an automated digital investigation is to initially occur for a previously discovered source), which can be daily, weekly, monthly, or never. The present example also includes a list 402 of found sources (e.g., potential phishing sources that are associated with search results for the specified search query). Each item in the list 402, for example, includes one or more tags (e.g., a label of "search-engine"), a value (e.g., a landing page that is associated with a search result), a found date, and a current scan frequency. As shown in the present example, each of the potential sources of phishing attempts in the list 402 of found sources can have a different scan frequency. As described elsewhere in this document (e.g., with respect to FIG. 5), a frequency at which automated digital investigations are performed on a potential source of phishing attempts can change over time, to focus processing resources on sources that are more likely to be actual sources of phishing attempts.

Figure 4B:
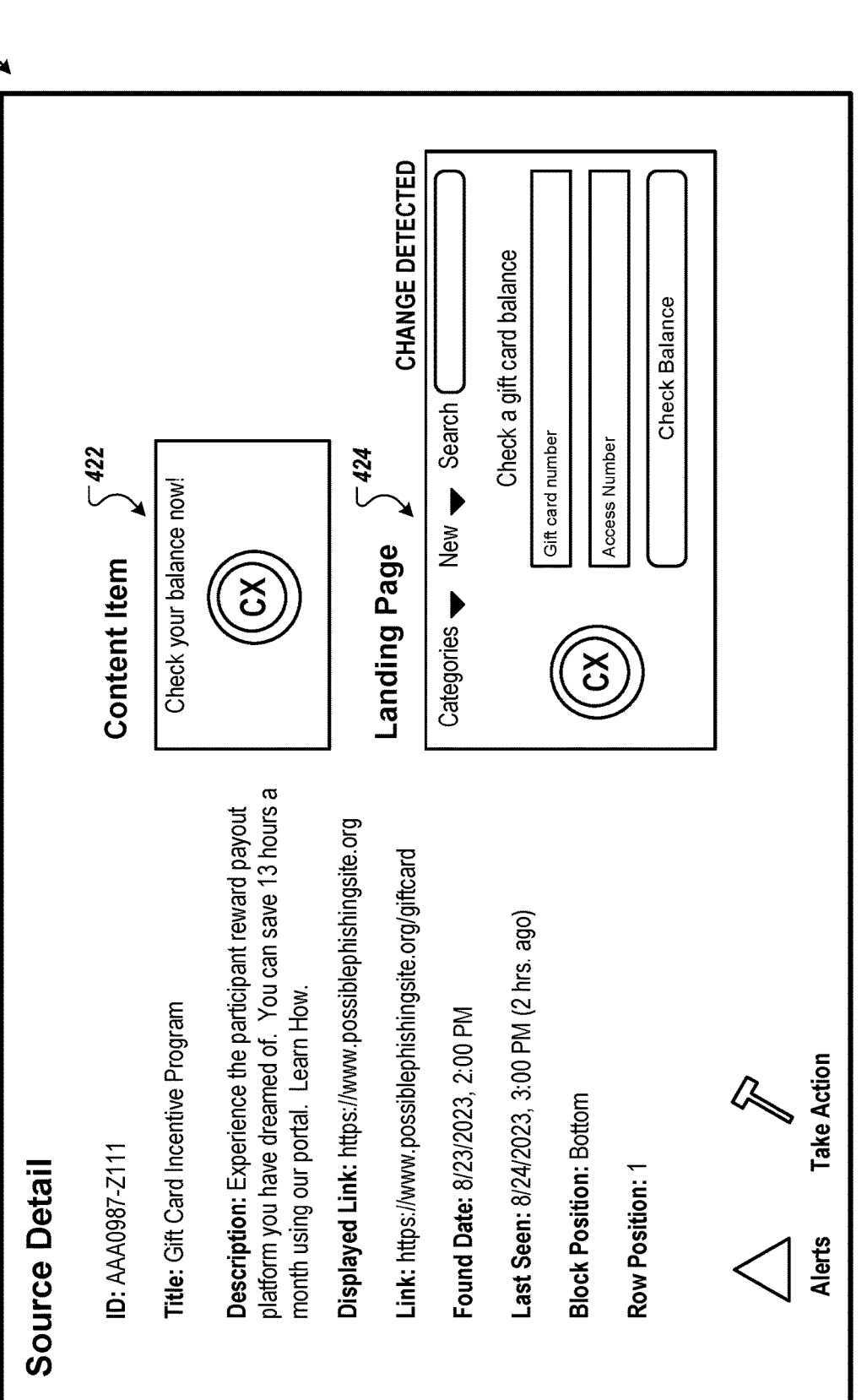

Referring now to FIG. 4B, an example interface 420 is depicted that can be provided by a phishing identification and mitigation system (e.g., systems 102, 104) for presenting information that results from the discovery of a potential source of phishing attempts, and the performance of an automated digital investigation of the potential source. The interface 420 of the present example can present the details of one of the potential sources in the list 402 of found sources presented in FIG. 4A. Similar detail presentation interfaces (not shown) can be configured for presenting the details of other sorts of discovered sources and automated digital investigations.

In the present example, the interface 420 includes an automatically assigned identifier (e.g., "AAA0987-Z111") for the potential source of phishing attempts, data related to the potential source that was identified during the discovery stage (e.g., stage (A)), and data that was identified during the automated digital investigation of the potential source (e.g., stage (B)). For example, in response to specified search terms (e.g., the search terms "CompanyX Gift Card," included in interface 400 shown in FIG. 4A), the search engine(s) 142 can return a sponsored search result that includes a content item 422 (e.g., a graphic image that includes a logo of "CompanyX" and a message to "Check your balance now!"). Further, the sponsored search result in the present example can include a title (e.g., "Gift Card Incentive Program"), a description, a hyperlink to the potential source of phishing attempts, and a displayed link. The interface 420 in the present example can also present metadata associated with the discovery of the potential source and/or the search result, including a found date (e.g., a timestamp of when the potential source was initially discovered), a last seen date (e.g., a timestamp of when the potential source was last monitored), and a position of the search result in a search interface that returned the search result. In the present example, the data related to the potential source that was identified during the automated digital investigation includes a screenshot of a landing page 424 of the potential source (e.g., a web page that appears to be configured to harvest a user's sensitive account information). The screenshots of the content item 422 and the landing page 424, for example, along with the other retrieved data and metadata, can facilitate the identification phishing attempts. Further, if a phishing attempt has been identified (e.g., as described in examples below), the interface 420 can present corresponding alerts and/or can facilitate the determination and/or performance of appropriate mitigation actions.

As shown in FIG. 1, during stage (C), an identification of phishing attempts can be performed. In general, the identification of phishing attempts can include analyzing the information that has been received for a potential source of phishing attempts during the discovery operation (e.g., stage (A)) and during the automated digital investigation (e.g., stage (B)). The identification of phishing attempts, for example, can use rules-based logic, automated content comparison techniques, and/or machine learning classification techniques.

Referring again to FIG. 3, for example, at 310, rules can be executed on the source information, and at 312, a determination can be performed of whether the source information matches any of the rules. For example, in response to having received and stored information for a potential source of phishing attempts, the phishing identification system 102 can access a set of predefined rules from a rules data repository 152 (shown in FIG. 1), and can execute each of the rules with respect to the previously received information for the potential source of phishing attempts. The rules can apply to various different aspects of the potential source and its metadata, such as the source content (e.g., text, graphics, audio, audiovisual media, etc.), registration/administration information for the source's domain, a delivery platform for the source, discovery techniques used to identify the source, and so forth.

In some implementations, one or more of the rules can include the application of content comparison techniques. For example, a rule can include a comparison between content that is associated with the potential source of phishing attempts (e.g., content on the source's landing page and/or content identified from a discovery of the source, such as a search result or a content item included in a content platform) and reference content (e.g., content that is included in a resource of the subject system 106). In the present example, a graphical image (e.g., the company logo included in the content item 422 and on the landing page 424, shown in FIG. 4B) can be compared to a corresponding graphical image of a website of the subject system 106. If the graphical images match (e.g., along with matches for other portions of the rule, such as the presence of particular keywords in the source content), for example, the potential source of phishing attempts can be determined as a likely actual phishing attempt. As another example, a rule can include a comparison between content that is currently associated with the potential source and a previous version of content from the source. If the content has changed, for example, the potential source of phishing attempts can be monitored more closely and/or more frequently. Content comparison, for example, can include various distance measurement techniques, such as Levenshtein distance, Hamming distance, or other suitable techniques.

In some implementations, one or more of the rules can include the application of machine learning classification techniques. For example, a set of potential sources of phishing can be manually labeled as actual sources of phishing (e.g., optionally specifying a particular type of phishing, such as gift card harvesting), and the manually labeled examples can be provided as training data for a machine learning model. After the machine learning model has been trained, for example, information that has been received for a potential source of phishing attempts can be provided to the model and the potential source can be classified as an actual source (e.g., with a confidence level), or as not an actual source.

Referring now to FIG. 4C, an example interface 440 is depicted that can be provided by a phishing identification and mitigation system (e.g., systems 102, 104) for identifying phishing attempts by applying a set of predetermined rules. The interface 440 of the present example can be used to specify a set of rules that are to be executed on the source information for a potential source of phishing attempts (e.g., information received for the potential source during discovery operation(s) and during automated digital investigation(s)). In some examples, a same set of predetermined rules can be applied to a potential source of phishing attempts regardless of a discovery technique that had been used to identify the potential source. In some examples, different sets of predetermined rules can be applied to potential sources of phishing attempts, based on a discovery technique that had been used to identify the potential sources.

In the present example, the interface 440 includes a list 442 of rules that have been created for automatically analyzing and labeling potential sources of phishing attempts. Each of the rules in the list 442, for example, can be executed by the phishing identification system 102, on the received information for a potential source. As shown in the present example, each of the rules can be associated with one or more labels (e.g., tags) that represent classifications for the potential source, so that an appropriate alert/mitigation can be determined for the potential source, and/or so that the potential source can be appropriately monitored over time. Also, in the present example, each of the rules can be associated with a title, a timestamp at which the rule was created, and a timestamp at which the rule was updated. The interface 440 in the present example also includes an indication for each rule of whether the rule is currently enabled, and a control to initiate the creation of new rules.

Figure 4D:
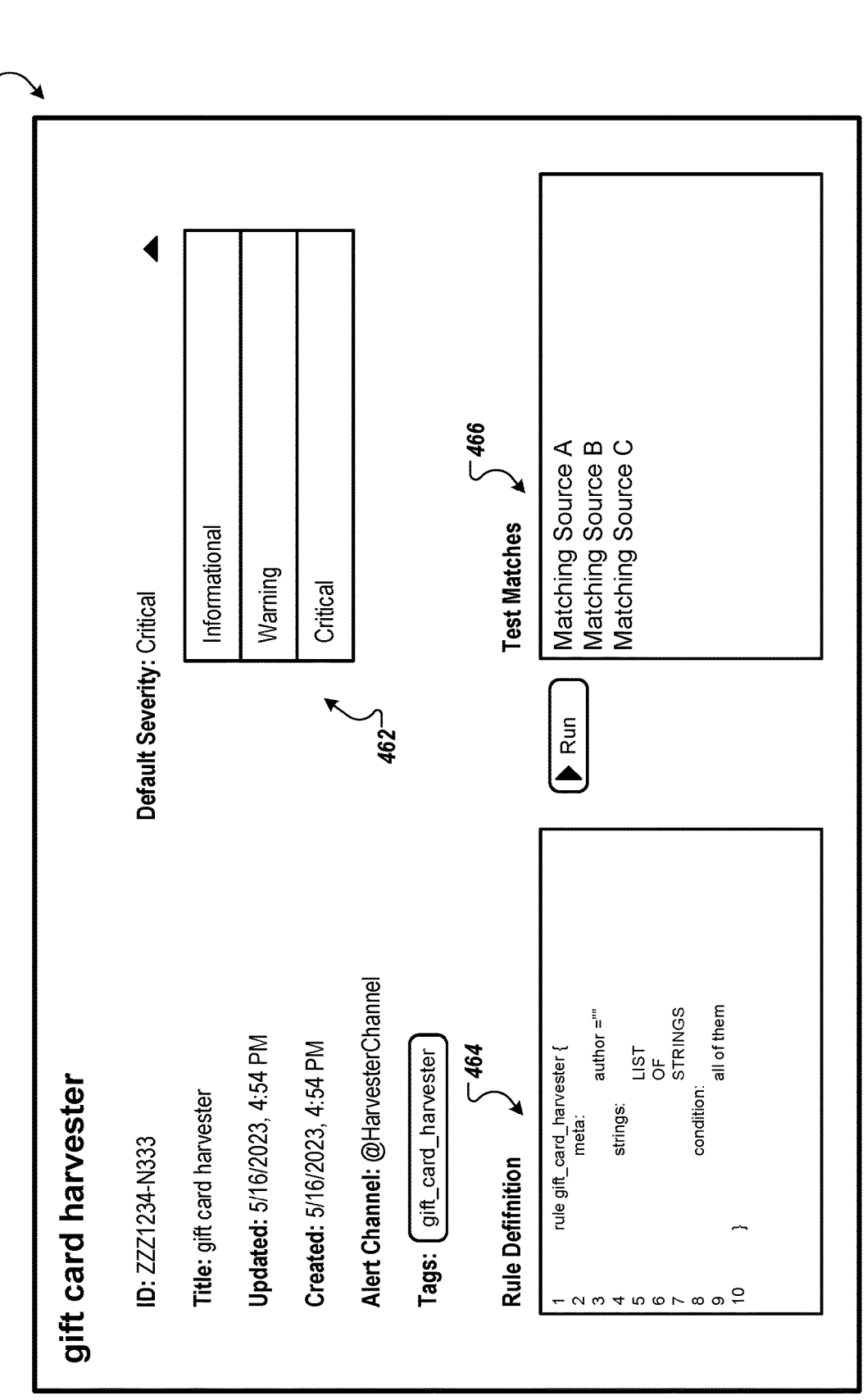

Referring now to FIG. 4D, an example interface 460 is depicted that can be provided by a phishing identification and mitigation system (e.g., systems 102, 104) for specifying a predetermined rule. The interface 460 in the present example can present further details of one of the rules (e.g., the "gift card harvester" rule) in the list 442 of rules presented in FIG. 4C. For example, the interface 460 can be presented in response to an operator selection of the rule from the list 442, or in response to an operator selection of the control to initiate the creation of new rules.

In the present example, the interface 460 includes an automatically assigned identifier for the rule (e.g., "ZZZ1234-N333"), a title of the rule (e.g., "gift card harvester"), a timestamp at which the rule was created, and a timestamp at which the rule was updated. The interface 460 in the present example can also be used to specify an alert channel (e.g., "@HarvesterChannel") to which an alert can be transmitted in response to a triggering of the rule, and one or more labels (e.g., a "gift_card_harvester" tag) to be associated with the potential source in response to the triggering. Also, the interface 460 in the present example can include a criticality designation control 462 through which an operator can specify a severity level (e.g., critical, warning, informational, and/or another appropriate level) that is to be applied to a potential source of phishing attempts that matches the rule. For example, a potential source of phishing attempts that has been labeled with a critical severity can trigger an alert and a corresponding mitigation action. As another example, a potential source that has been labeled with a warning severity can trigger an alert without a mitigation action. As another example, a potential source that has been labeled with an informational severity can simply be monitored again in the future. The interface 460 in the present example can also include a rule definition control 464, through which an operator can specify computer code (e.g., using YARA or another suitable coding language) to be executed against a potential source and its related data. In the present example, the interface 460 can also include a test matches control 466 that presents potential sources that match the presently specified rule definition (e.g., in response to operator selection of a "Run" control). Thus, the interface 460 can serve as a live editing tool that enables security specialists to interactively develop and test rules before the rules are placed into production.

Referring again to FIG. 3, for example, at 314, in response to the source information matching any of the rules, one or more labels can be applied to the potential source of phishing attempts. For example, after executing each rule of a set of rules (e.g., the rules included in the list 442 of rules, shown in FIG. 4C), the phishing identification system 102 can determine whether the rule matches the source information of the potential source, and in response to the rule matching the source information, can apply the corresponding one or more labels (e.g., the tags) for the rule. After applying the labels, for example, label information can stored with other related information for the potential source in the discovered sources data repository 150. In general, executing the rules and determining matches for a possible source of phishing attempts can be a relatively brief but computationally expensive process. Thus, the process is executed periodically according to an appropriately customized schedule for the possible source, thus conserving processing resources.

At 316, a determination can be performed of whether any critical labels have been applied to the potential source of phishing attempts. For example, after labeling the potential source of phishing attempts based on its matching rules, the phishing identification system 102 can determine the severity levels associated with each of the labels. Referring again to FIG. 4D, for example, the "gift card harvester" rule is associated with a severity level of critical.

At 318, in response to one or more critical labels having been applied to the potential source of phishing attempts (and optionally, in response to a label that indicates a lesser severity, such as a warning, having been applied), corresponding alert(s) can be generated that indicate that the source is likely an actual source of phishing attempts. During stage (D), for example, the phishing identification system 102 can generate and provide an alert to the phishing mitigation system 104. In general, alerts can include information related to the potential source from the discovered sources data repository 150, and can be transmitted through a communication channel to one or more recipients. In some implementations, different communication channels can be configured to receive alerts for differently labeled potential sources. Referring again to FIG. 4D, for example, if the "gift card harvester" rule is triggered for a potential source of phishing attempts, a corresponding alert can be transmitted using its specified alert channel (e.g., "@HarvesterChannel"). The specified alert channel, for example, can be monitored by a security specialist and/or an automated computer system, for the purpose of performing appropriate actions to mitigate phishing attempts from the potential source.

At 320, one or more mitigation actions can be determined and performed, in response to a received critical alert for a potential source of phishing attempts. During stages (E) and (F), for example, the phishing mitigation system 104 can respectively determine and perform one or more appropriate mitigation actions for preventing phishing attempts by the potential source, in response to receiving the alert. In some implementations, determining an appropriate mitigation action can include identifying a web hosting service for the potential source and submitting an automated request to the web hosting service that it cease hosting the potential source. In some implementations, determining an appropriate mitigation action can be based at least in part on a discovery technique that was used to discover the potential source of phishing attempts. If the potential source was discovered based on data received from a search engine 142, for example, an appropriate mitigation action can include submitting an automated request to the search engine that it not surface sponsored search results and/or organic search results that link to the potential source. As another example, if the potential source was discovered based on data received from a content platform 144, for example, an appropriate mitigation action can include submitting an automated request to the content platform that it not accept content items that link to the potential source. Other appropriate mitigation actions are possible.

At 322, a frequency can be adjusted for performing a scan of the potential source of phishing attempts. As described above, after performing an initial automated digital investigation of a potential source (e.g., stage (B)), subsequent automated digital investigations of the potential source can be periodically repeated according to an appropriate customized schedule for the potential source. In some implementations, if a potential source has triggered a rule that is associated with a critical severity, the frequency for performing automated digital investigations of the potential source can be increased or can remain high, whereas if the potential source has not triggered such a rule, the frequency for performing automated digital investigations of the potential source can be steadily decreased over time. By increasing or maintaining a high scan frequency for critically labeled potential sources of phishing attempts, for example, a result of a performed mitigation action can be actively monitored and verified. In some implementations, if the content of a potential source has been found to change since a previous performance of an automated digital investigation, the frequency for performing automated digital investigations of the potential source can be increased or can remain high, whereas if the content has not been found to change, the frequency for performing automated digital investigations of the potential source can be steadily decreased over time. By increasing or maintaining a high scan frequency for potential sources of phishing attempts that include regularly changing content, for example, an actual phishing attempt can be identified and mitigated soon after it occurs (e.g., in the case of an initially benign source that transitions into an actual source of phishing attempts).

At 324, a potential source of phishing attempts can possibly be rediscovered. In general, rediscovery of a potential source of phishing attempts can occur after adjusting a scan frequency (e.g., at 322), or before adjusting the scan frequency. For example, the phishing identification system 102 can again perform a discovery of new sources (e.g., stage (A)), using any of the discovery techniques described with respect to FIG. 2. During the discovery process, for example, the potential source can be rediscovered using a same technique as during a previous discovery process, or a new technique. For example, a potential source can be previously discovered through a trusted third party source 130, and later rediscovered through a search engine 142 or a content platform 144. As another example, a potential source can be previously discovered through a content platform, and again discovered through the same content platform. In some implementations, if a potential source is rediscovered using a technique that differs from that of a previous discovery, the frequency for performing automated digital investigations of the potential source can be increased or can remain high, whereas if the potential source is rediscovered using a same techniques as that of a previous discovery, the frequency of performing automated digital investigations of the potential source can steadily decrease over time.

Referring now to FIG. 5, an example schedule 500 and example activity data logs 520a, 520b of an automated digital forensic investigation is depicted. The example schedule 500, for example, is a frequency graph that plots the frequency at which automated digital investigations are performed over time, for two different potential sources of phishing attempts (e.g., Potential Source A, represented by frequency plot 510a, and Potential Source B, represented by frequency plot 510b). The example activity data logs 520a, 520b, for example, show logged activity for each of the two different potential sources, with the activity data log 520a (e.g., a data log for Potential Source A) corresponding to the frequency plot 510a, and with the activity data log 520b (e.g., a data log for Potential Source B) corresponding to the frequency plot 510b.

In the present example, with respect to the activity data log 520a for Potential Source A, the source has been newly discovered and tagged (e.g., with a label indicating the discovery technique used to identify the source) as a result of a domain search (e.g., based on data provided by the trusted third party source(s) 130) that was performed at the beginning of the timeline of the example schedule 500 (e.g., at Month 0). After the Potential Source A is discovered (and optionally, after an initial automated digital investigation of the source has been performed), for example, the phishing identification system 102 can schedule a time at which a next automated digital investigation is to occur for the potential source, based on a default scan frequency that has been specified for the discovery technique (e.g., the default scan frequency shown in FIG. 4A). In the present example, a next action (e.g., the next automated digital investigation) is to occur twenty-four hours after the initial discovery of Potential Source A.

During the next automated digital investigation, for example, a set of rules are run against Potential Source A, with the result of no rules being triggered (or merely rules that are associated with informational labels with a low severity level). In the present example, in response to the result of the rules execution, the phishing identification system 102 can adjust the frequency at which automated digital investigations are to occur in the future (e.g., the scan frequency) to be less frequent (e.g., with the next action being scheduled to occur twenty-six hours after the previous action). As further automated digital investigations occur for Potential Source A in the present example, the results continue to be that of no rules being triggered (or rules associated with low-severity labels being triggered). Thus, an amount of time between automated digital investigations for Potential Source A in the present example can be steadily increased over time (e.g., with weekly scans being performed around the one month mark after the initial discovery, and with monthly scans being performed around the three month mark after the initial discovery). By steadily increasing the amount of time in between automated digital investigations, for example, Potential Source A can continue to be regularly monitored at an appropriate frequency, thereby conserving computing resources for other potential sources of phishing attempts that are more likely to be actual sources, while not losing track of Potential Source A (e.g., in case the presently benign source is eventually modified to be an actual source of phishing attempts at a later point in time).

Similarly, in the present example, with respect to the activity data log 520b for Potential Source B, the source has been newly discovered and tagged as a result of a domain search that was performed at the beginning of the timeline of the example schedule 500. In the present example (and similar to Potential Source A), over an initial time period after having been newly discovered (e.g., a time period of approximately one month), automated digital investigations can continue to be performed for Potential Source B at periodic, ever-increasing intervals. During each of the automated digital investigations, for example, the set of rules can be executed against the information for Potential Source B, with none of the executed rules revealing an issue having a critical severity, and in response, a time interval for performing a next automated digital investigation can be increased.

However, in the present example, at approximately the one-month mark, an execution of the set of rules has revealed a content change for Potential Source B (e.g., a change in content of a homepage of the potential source of phishing attempts), but with no rules being triggered that indicate a critical issue. In response to the content change, for example, the phishing identification system 102 can decrease the frequency of future automated digital investigations (e.g., resetting the frequency to the default frequency of twenty-four hours). In the present example, subsequent automated digital investigations can be performed for Potential Source B over a period of approximately one week, with no critical rules being triggered, and with the frequency of automated digital investigations being again steadily decreased.

At approximately the one week mark after detecting the content change, for example, Potential Source B can be rediscovered (e.g., using a discovery technique that involves submitting a search query to the search engine(s) 142, through an operation that is separate from the automated digital investigations). In the present example, Potential Source B can be tagged with a label indicating the discovery technique, and the set of rules can be immediately re-executed against the stored information for Potential Source B (e.g., at a point in time that is outside of a previously scheduled time for performing a next automated digital investigation). At this time, when the set of rules is executed, a rule that is associated with a critical severity level can be triggered (e.g., in response to detecting a high likelihood of a phishing attempt), and the critical alert can be transmitted to the phishing mitigation system 104, which can perform one or more mitigation actions (e.g., a takedown of Potential Source B) in response to receiving the alert. The phishing identification system 102, for example, can schedule an appropriate time for a follow-up automated digital investi-gation (e.g., to verify whether the mitigation action was successful) at an appropriate time (e.g., six hours after performing the action). The phishing identification system 102 can then perform the follow-up automated digital inves-tigation, verify that the mitigation action was successfully performed, assign a label to Potential Source B, and adjust the scan frequency appropriately (e.g., setting a time for a next automated digital investigation to occur twelve hours in the future). In the present example, no further issues having a critical security level are detected for Potential Source B (e.g., the source continues to be inactive), and the frequency of automated digital investigations can continue to be steadily decreased over time. By appropriately adjusting the frequency of automated digital investigations (e.g., increas-ing the frequency in response to changes and critical events, and decreasing the frequency in response to content stability and non-critical events), for example, Potential Source B can be appropriately monitored according to its current status, thus increasing the likelihood that actual sources of phishing attempts will be promptly detected and handled.

Figure 6:
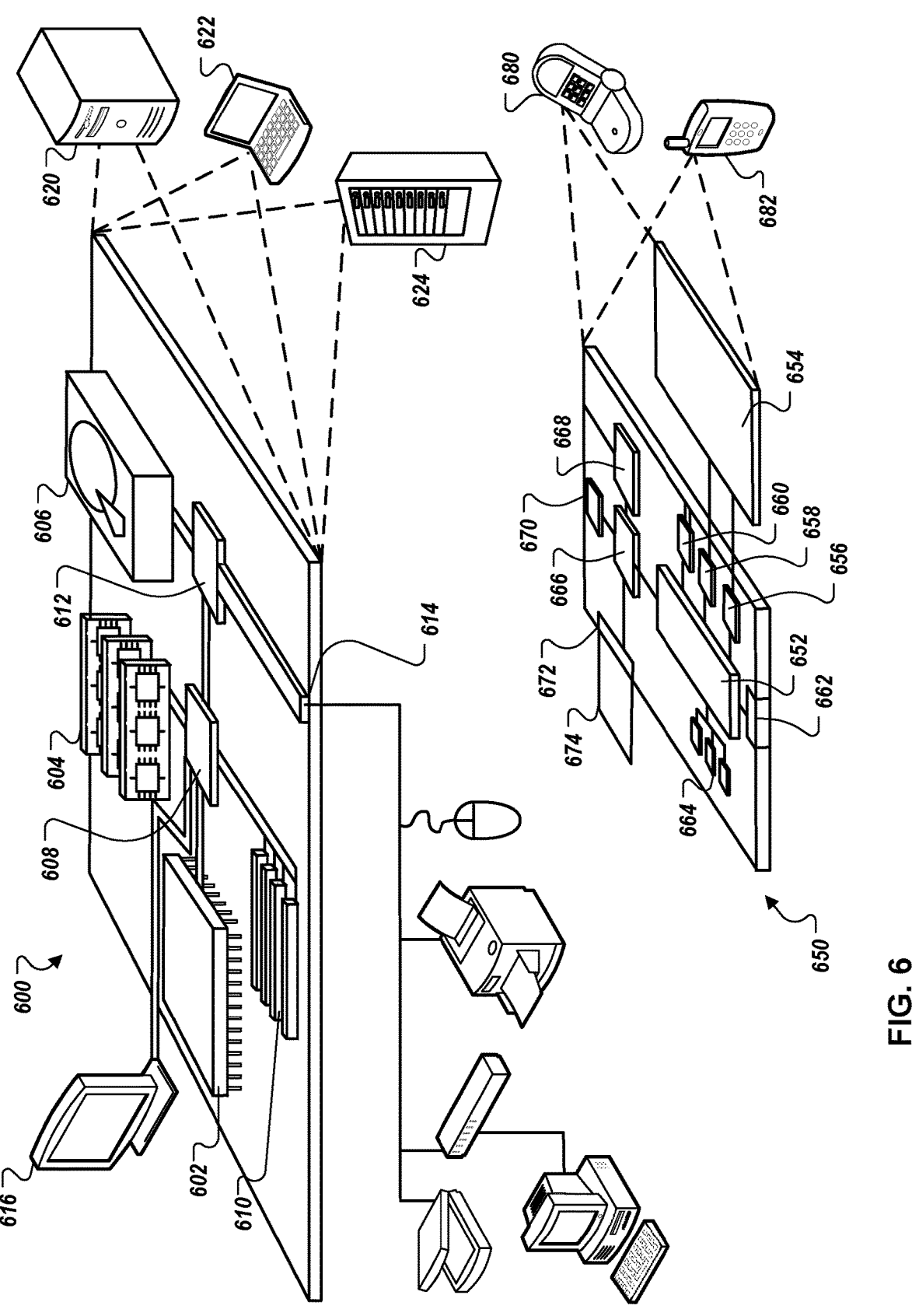
FIG. 6 is a schematic diagram that shows an example of a computing device and a mobile computing device.

FIG. 6 shows an example of a computing device 600 and an example of a mobile computing device 650 that can be used to implement the techniques described here. The com-puting device 600 is intended to represent various forms of digital computers, such as laptops, desktops, workstations, personal digital assistants, servers, blade servers, main-frames, and other appropriate computers. The mobile com-puting device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 con-necting to a low-speed expansion port 614 and the storage device 606. Each of the processor 602, the memory 604, the storage device 606, the high-speed interface 608, the high-speed expansion ports 610, and the low-speed interface 612, are interconnected using various busses, and can be mounted on a common motherboard or in other manners as appro-priate. The processor 602 can process instructions for execu-tion within the computing device 600, including instructions stored in the memory 604 or on the storage device 606 to display graphical information for a GUI on an external input/output device, such as a display 616 coupled to the high-speed interface 608. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 can also be another form of computer-readable medium, such as a magnetic or optical disk.

The storage device 606 is capable of providing mass storage for the computing device 600. In some implemen-tations, the storage device 606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-inten-sive operations for the computing device 600, while the low-speed interface 612 manages lower bandwidth-inten-sive operations. Such allocation of functions is exemplary only. In some implementations, the high-speed interface 608 is coupled to the memory 604, the display 616 (e.g., through a graphics processor or accelerator), and to the high-speed expansion ports 610, which can accept various expansion cards (not shown). In the implementation, the low-speed interface 612 is coupled to the storage device 606 and the low-speed expansion port 614. The low-speed expansion port 614, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 620, or multiple times in a group of such servers. In addition, it can be implemented in a personal computer such as a laptop computer 622. It can also be implemented as part of a rack server system 624. Alternatively, components from the com-puting device 600 can be combined with other components in a mobile device (not shown), such as a mobile computing device 650. Each of such devices can contain one or more of the computing device 600 and the mobile computing device 650, and an entire system can be made up of multiple computing devices communicating with each other.

The mobile computing device 650 includes a processor 652, a memory 664, an input/output device such as a display 654, a communication interface 666, and a transceiver 668, among other components. The mobile computing device 650 can also be provided with a storage device, such as a micro-drive or other device, to provide additional storage. Each of the processor 652, the memory 664, the display 654, the communication interface 666, and the transceiver 668, are interconnected using various buses, and several of the components can be mounted on a common motherboard or in other manners as appropriate.

The processor 652 can execute instructions within the mobile computing device 650, including instructions stored in the memory 664. The processor 652 can be implemented as a chipset of chips that include separate and multiple analog and digital processors. The processor 652 can pro-vide, for example, for coordination of the other components of the mobile computing device 650, such as control of user interfaces, applications run by the mobile computing device 650, and wireless communication by the mobile computing device 650.

The processor 652 can communicate with a user through a control interface 658 and a display interface 656 coupled to the display 654. The display 654 can be, for example, a TFT (Thin-Film-Transistor Liquid Crystal Display) display or an OLED (Organic Light Emitting Diode) display, or other appropriate display technology. The display interface 656 can comprise appropriate circuitry for driving the display 654 to present graphical and other information to a user. The control interface 658 can receive commands from a user and convert them for submission to the processor 652. In addition, an external interface 662 can provide communication with the processor 652, so as to enable near area communication of the mobile computing device 650 with other devices. The external interface 662 can provide, for example, for wired communication in some implementations, or for wireless communication in other implementations, and multiple interfaces can also be used.

The memory 664 stores information within the mobile computing device 650. The memory 664 can be implemented as one or more of a computer-readable medium or media, a volatile memory unit or units, or a non-volatile memory unit or units. An expansion memory 674 can also be provided and connected to the mobile computing device 650 through an expansion interface 672, which can include, for example, a SIMM (Single In Line Memory Module) card interface. The expansion memory 674 can provide extra storage space for the mobile computing device 650, or can also store applications or other information for the mobile computing device 650. Specifically, the expansion memory 674 can include instructions to carry out or supplement the processes described above, and can include secure information also. Thus, for example, the expansion memory 674 can be provide as a security module for the mobile computing device 650, and can be programmed with instructions that permit secure use of the mobile computing device 650. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 664, the expansion memory 674, or memory on the processor 652. In some implementations, the computer program product can be received in a propagated signal, for example, over the transceiver 668 or the external interface 662.

The mobile computing device 650 can communicate wirelessly through the communication interface 666, which can include digital signal processing circuitry where necessary. The communication interface 666 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 668 using a radio-frequency. In addition, short-range communication can occur, such as using a Bluetooth, WiFi, or other such transceiver (not shown). In addition, a GPS (Global Positioning System) receiver module 670 can provide additional navigation- and location-related wireless data to the mobile computing device 650, which can be used as appropriate by applications running on the mobile computing device 650.

The mobile computing device 650 can also communicate audibly using an audio codec 660, which can receive spoken information from a user and convert it to usable digital information. The audio codec 660 can likewise generate audible sound for a user, such as through a speaker, e.g., in a handset of the mobile computing device 650. Such sound can include sound from voice telephone calls, can include recorded sound (e.g., voice messages, music files, etc.) and can also include sound generated by applications operating on the mobile computing device 650.

The mobile computing device 650 can be implemented in a number of different forms, as shown in the figure. For example, it can be implemented as a cellular telephone 680. It can also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computer-implemented method for performing automated digital investigations of phishing attempts, the method comprising:

inserting a tracking component into a sensitive web page of a subject system;

receiving source identification data that identifies a potential source of phishing attempts, wherein at least a portion of the received source identification data includes an address of a copy of the sensitive web page of the subject system that has been received through the tracking component, wherein the copy of the web page is being hosted by a web server other than that of the subject system;

storing the source identification data at a data repository of discovered potential sources of phishing attempts, wherein the source identification data is stored at the data repository with data indicating that a tracked page discovery technique has been used to discover the potential source of phishing attempts;

determining that another, different discovery technique has also been used to discover the potential source of phishing attempts;

in response to determining that the tracked page discovery technique and the another, different discovery technique have both been used to independently discover the potential source of phishing attempts at different times, increasing a monitoring frequency for the potential source of phishing attempts; and according to the monitoring frequency for the potential source of phishing attempts, periodically performing monitoring operations on the potential source of phishing attempts, the monitoring operations comprising:

using the source identification data to retrieve content from the potential source of phishing attempts;

storing the retrieved content of the potential source of phishing attempts with the source identification data that identifies the potential source of phishing attempts;

executing a set of predefined rules on the source identification data and the retrieved content of the potential source of phishing attempts, wherein at least one predefined rule in the set of predefined rules includes a graphical comparison between a subject image included on the sensitive web page of the subject system and a retrieved image included in the retrieved content of the potential source of phishing attempts; and based on a result of executing the set of predefined rules, (i) determining whether the potential source of phishing attempts is an actual source of phishing attempts, and (ii) adjusting the monitoring frequency for the potential source of phishing attempts such that subsequent performances of the monitoring operations occur at a frequency that is different from a current frequency for performing the monitoring operations.

2. The computer-implemented method of claim 1, further comprising:

providing a domain search for a domain registrar, wherein the domain search includes one or more search terms that relate to the subject system; and wherein the received source identification data includes a domain name of the potential source of the phishing attempts, and wherein the domain name has been provided by the domain registrar in response to the domain search.

3. The computer-implemented method of claim 1, further comprising:

providing a search query for a search engine, wherein the search query includes one or more search terms that relate to the subject system; and wherein the received source identification data includes a hyperlink to a landing page of the potential source of phishing attempts, and wherein the hyperlink to the landing page has been provided by the search engine in response to the search query.

4. The computer-implemented method of claim 1, further comprising:

providing an identifier of a platform page of a content platform; and wherein the received source identification data includes (i) an image of a content item being presented by the platform page and (ii) a hyperlink to a landing page of the potential source of phishing attempts that is associated with the content item, and wherein the hyperlink to the landing page and the image of the content item being presented by the platform page have been located using the identifier of the platform page.

5. The computer-implemented method of claim 1, wherein each rule of the set of predefined rules is associated with a corresponding severity level, and wherein determining whether the potential source of phishing attempts is an actual source of phishing attempts includes determining whether at least one rule that matches the potential source of phishing attempts has a critical severity level.

6. The computer-implemented method of claim 1, further comprising:

in response to determining that the potential source of phishing attempts is an actual source of phishing attempts, (i) generating and transmitting an alert that identifies the source of phishing attempts, and (ii) increasing the monitoring frequency for the source of phishing attempts.

7. The computer-implemented method of claim 6, wherein the alert is transmitted to a communication channel that had previously been specified through a rule generation interface that had been used to create a rule of the set of predefined rules that matches the source of phishing attempts.

8. The computer-implemented method of claim 6, wherein the alert is transmitted to a phishing mitigation system that is configured to perform a mitigating action to handle the source of phishing attempts.

9. The computer-implemented method of claim 1, further comprising:

in response to determining that the potential source of phishing attempts is not an actual source of phishing attempts, decreasing the monitoring frequency for the source of phishing attempts.

10. The computer-implemented method of claim 1, further comprising:

executing at least one discovery operation rule on the received source identification data that identifies the potential source of phishing attempts; and wherein the source identification data is stored at the data repository of discovered potential sources of phishing attempts, and the monitoring operations are performed on the potential source of phishing attempts, in response to the source identification data matching the at least one discovery operation rule.

11. The computer-implemented method of claim 1, further comprising:

presenting an interface for specifying a rule to be included in the set of predefined rules, wherein the interface includes a rule definition control for defining computer code that is to be executed against the potential source of phishing attempts.

12. A computer system comprising:

one or more data processing apparatuses including one or more processors, memory, and storage devices storing instructions that, when executed, cause the one or more processors to perform operations comprising:

inserting a tracking component into a sensitive web page of a subject system;

receiving source identification data that identifies a potential source of phishing attempts, wherein at least a portion of the received source identification data includes an address of a copy of the sensitive web page of the subject system that has been received through the tracking component, wherein the copy of the web page is being hosted by a web server other than that of the subject system;

storing the source identification data at a data repository of discovered potential sources of phishing attempts, wherein the source identification data is stored at the data repository with data indicating that a tracked page discovery technique has been used to discover the potential source of phishing attempts;

determining that another, different discovery technique has also been used to discover the potential source of phishing attempts;

in response to determining that the tracked page discovery technique and the another, different discovery technique have both been used to independently discover the potential source of phishing attempts at different times, increasing a monitoring frequency for the potential source of phishing attempts; and according to the monitoring frequency for the potential source of phishing attempts, periodically performing monitoring operations on the potential source of phishing attempts, the monitoring operations comprising:

using the source identification data to retrieve content from the potential source of phishing attempts;

storing the retrieved content of the potential source of phishing attempts with the source identification data that identifies the potential source of phishing attempts;

executing a set of predefined rules on the source identification data and the retrieved content of the potential source of phishing attempts, wherein at least one predefined rule in the set of predefined rules includes a graphical comparison between a subject image included on the sensitive web page of the subject system and a retrieved image included in the retrieved content of the potential source of phishing attempts; and based on a result of executing the set of predefined rules, (i) determining whether the potential source of phishing attempts is an actual source of phishing attempts, and (ii) adjusting the monitoring frequency for the potential source of phishing attempts such that subsequent performances of the monitoring operations occur at a frequency that is different from a current frequency for performing the monitoring operations.

13. The computer system of claim 12, the operations further comprising:

providing a domain search for a domain registrar, wherein the domain search includes one or more search terms that relate to the subject system; and wherein the received source identification data includes a domain name of the potential source of the phishing attempts, and wherein the domain name has been provided by the domain registrar in response to the domain search.

14. The computer system of claim 12, the operations further comprising:

providing a search query for a search engine, wherein the search query includes one or more search terms that relate to the subject system; and wherein the received source identification data includes a hyperlink to a landing page of the potential source of phishing attempts, and wherein the hyperlink to the landing page has been provided by the search engine in response to the search query.

15. The computer system of claim 12, the operations further comprising:

providing an identifier of a platform page of a content platform; and wherein the received source identification data includes (i) an image of a content item being presented by the platform page and (ii) a hyperlink to a landing page of the potential source of phishing attempts that is associated with the content item, and wherein the hyperlink to the landing page and the image of the content item being presented by the platform page have been located using the identifier of the platform page.

16. A non-transitory computer-readable storage medium coupled to one or more processors and having instructions stored thereon which, when executed by the one or more processors, cause the one or more processors to perform operations comprising:

inserting a tracking component into a sensitive web page of a subject system;

receiving source identification data that identifies a potential source of phishing attempts, wherein at least a portion of the received source identification data includes an address of a copy of the sensitive web page of the subject system that has been received through the tracking component, wherein the copy of the web page is being hosted by a web server other than that of the subject system;

storing the source identification data at a data repository of discovered potential sources of phishing attempts, wherein the source identification data is stored at the data repository with data indicating that a tracked page discovery technique has been used to discover the potential source of phishing attempts;

determining that another, different discovery technique has also been used to discover the potential source of phishing attempts;

in response to determining that the tracked page discovery technique and the another, different discovery technique have both been used to independently discover the potential source of phishing attempts at different times, increasing a monitoring frequency for the potential source of phishing attempts; and according to the monitoring frequency for the potential source of phishing attempts, periodically performing monitoring operations on the potential source of phishing attempts, the monitoring operations comprising:

using the source identification data to retrieve content from the potential source of phishing attempts;

storing the retrieved content of the potential source of phishing attempts with the source identification data that identifies the potential source of phishing attempts;

executing a set of predefined rules on the source identification data and the retrieved content of the potential source of phishing attempts, wherein at least one predefined rule in the set of predefined rules includes a graphical comparison between a subject image included on the sensitive web page of the subject system and a retrieved image included in the retrieved content of the potential source of phishing attempts; and based on a result of executing the set of predefined rules, (i) determining whether the potential source of phishing attempts is an actual source of phishing attempts, and (ii) adjusting the monitoring frequency for the potential source of phishing attempts such that subsequent performances of the monitoring operations occur at a frequency that is different from a current frequency for performing the monitoring operations.

17. The non-transitory computer-readable storage medium of claim 16, the operations further comprising:

providing a domain search for a domain registrar, wherein the domain search includes one or more search terms that relate to the subject system; and wherein the received source identification data includes a domain name of the potential source of the phishing attempts, and wherein the domain name has been provided by the domain registrar in response to the domain search.

18. The non-transitory computer-readable storage medium of claim 16, the operations further comprising:

providing a search query for a search engine, wherein the search query includes one or more search terms that relate to the subject system; and wherein the received source identification data includes a hyperlink to a landing page of the potential source of phishing attempts, and wherein the hyperlink to the landing page has been provided by the search engine in response to the search query.

19. The non-transitory computer-readable storage medium of claim 16, the operations further comprising:

providing an identifier of a platform page of a content platform; and wherein the received source identification data includes (i) an image of a content item being presented by the platform page and (ii) a hyperlink to a landing page of the potential source of phishing attempts that is associated with the content item, and wherein the hyperlink to the landing page and the image of the content item being presented by the platform page have been located using the identifier of the platform page.

\* \* \* \* \*